(12) United States Patent
Lee

(10) Patent No.: US 7,695,836 B2
(45) Date of Patent: Apr. 13, 2010

(54) METHOD FOR INITIAL ACTIVATION OF POLYMER ELECTROLYTE FUEL CELL

(75) Inventor: Jong Hyun Lee, Seongnam (KR)

(73) Assignee: Hyundai Motor Company, Seoul (KR)

( * ) Notice: Subject to any disclaimer, the term of this patent is extended or adjusted under 35 U.S.C. 154(b) by 1536 days.

(21) Appl. No.: 10/998,255

(22) Filed: Nov. 26, 2004

(65) Prior Publication Data

US 2005/0118466 A1 Jun. 2, 2005

(30) Foreign Application Priority Data

Nov. 27, 2003 (KR) .................. 10-2003-0085160

(51) Int. Cl.
*H01M 8/00* (2006.01)
(52) U.S. Cl. .......................... 429/13; 429/22
(58) Field of Classification Search .............. 429/13, 429/17, 12, 22, 25, 30
See application file for complete search history.

(56) References Cited

U.S. PATENT DOCUMENTS

2002/0177017 A1* 11/2002 Nelson et al. .............. 429/22
2004/0137292 A1* 7/2004 Takebe et al. .............. 429/23

* cited by examiner

*Primary Examiner*—Patrick Ryan
*Assistant Examiner*—Monique Wills
(74) *Attorney, Agent, or Firm*—Edwards Angell Palmer & Dodge LLP; Peter F. Corless

(57) ABSTRACT

A method for an initial activation of a polymer electrolyte fuel cell includes: humidifying a fuel cell stack; performing a small-current driving operation for applying a small current to the humidified fuel cell stack; and performing an activating operation by repeatedly performing an activation cycle a predetermined number of times. The activation cycle includes: a first driving operation for driving the fuel cell stack to output a first predetermined voltage; a first pausing operation for controlling the fuel cell stack in a no-load open-circuit voltage state; a second driving operation for driving the fuel cell to output a second predetermined voltage; and a second pausing operation for controlling the fuel cell stack in the no-load open-circuit voltage state.

6 Claims, 3 Drawing Sheets

METHOD FOR INITIAL ACTIVATION OF POLYMER ELECTROLYTE FUEL CELL

CROSS REFERENCE TO RELATED APPLICATION

This application claims priority of Korean Application No. 10-2003-0085160, filed on Nov. 27, 2003, the disclosure of which is incorporated herein by reference.

TECHNICAL FIELD OF THE INVENTION

The present invention relates to a polymer electrolyte fuel cell (PEFC), and more particularly, to a method for an initial activation of the PEFC just after manufacturing the same.

BACKGROUND OF THE INVENTION

Generally, a fuel cell generates electricity through an electro-chemical reaction between hydrogen supplied to a fuel electrode and air supplied to an air electrode. The electrochemical reaction between the hydrogen and the air is derived by an electrolyte membrane that is disposed between the air electrode and the fuel electrode. A fuel cell that has a solid type electrolyte membrane is generally called a polymer electrolyte fuel cell (PEFC), or a solid polymer electrolyte fuel cell.

The electrolyte membrane of a PEFC is generally made of a poly(tetrafluoroethylene) based ionomer, such as Nafion (registered trademark) of DuPont Co.

The normal operating condition of the electrolyte membrane is preferably between normal ambient temperature and 80° C., more preferably, between 55 and 65° C., and temperatures of the fuel and the oxidizing gas are preferably similar to body temperature, more preferably within a temperature difference of 10° C. In addition, an amount of supplied hydrogen (fuel gas) is preferably 1.7 to 2.0 times of a theoretical amount thereof, and an amount of supplied air (oxidizing gas) is preferably 1.2 to 1.5 times of a theoretical amount thereof. Meanwhile, the PEFC is an energy generating device having a low-voltage and high-current characteristic, and a theoretical maximum output voltage of a unit cell is 1.23V in an open-circuit state. However, a plurality of unit cells must be used for a power source of a vehicle, and it is preferable that power in a voltage range of 0.4~0.9V is used for the unit cell to provide reasonable energy conversion efficiency of the fuel cell.

However, in a normal operating range of a PEFC, the fuel cell output can be mainly determined by movements of electrons and ions generated during the electrochemical reaction of the fuel cell. In particular, such electron and ion flow relates to a passage or movement of protons.

Therefore, initial activation of a fuel cell, i.e., to make sufficient passage of protons before a normal operation phase of the fuel cell, just after manufacturing the fuel cell, is needed, in order to achieve an efficiency of the fuel cell in a short time even if the fuel cell does not operate for a long time.

In a conventional method for initial activation, load that is continuously changed according to a load changing curve, and load cycles according to a forward load changing curve and a reverse load changing curve are alternately applied several times.

However, in such a conventional method for fuel cell initial activation of the fuel cell, the operation must be continuously performed for more than a day, and the extent of passages produced for protons also can be limited.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention includes methods for initial activation of a polymer electrolyte fuel cell that can provide notable advantages, such as reduced activation times and can avoid the need for extended continuous operation cycles. Additionally, overall efficiency of a fuel cell that is activated in accordance with the invention can be significantly improved.

An exemplary method for initial activation of a polymer electrolyte fuel cell according to an embodiment of the present invention includes: optionally humidifying a fuel cell stack; performing a current driving operation for applying current (power) to the humidified fuel cell stack; and performing an activating operation by repeatedly performing an activation cycle a predetermined number of times. The activation cycle includes: a first driving operation for driving the fuel cell stack to output a first predetermined voltage; a first pausing operation for controlling the fuel cell stack in a no-load open-circuit voltage state; a second driving operation for driving the fuel cell to output a second predetermined voltage; and a second pausing operation for controlling the fuel cell stack in the no-load open-circuit voltage state.

In a further embodiment of the present invention, humidifying the fuel cell stack is performed until a temperature of the fuel cell stack reaches a predetermined humidifying temperature.

In a still further embodiment of the present invention, the predetermined humidifying temperature is determined as a temperature within a range of about 53° C. to 57° C.

In another embodiment of the present invention, the predetermined number of times that the activation cycle is performed is determined on the basis of output of the fuel cell stack.

In a further embodiment of the present invention, performing the activating operation is considered finished if an output of the fuel cell stack at an end of a previous activating operation becomes greater than about 95% of an output of the fuel cell stack at an end of a current activating operation.

In a still further embodiment of the present invention, a method for initial activation further comprises performing a fuel cell test operation, before humidifying the fuel cell stack, wherein performing the fuel cell test operation comprises: measuring an open-circuit voltage of the polymer electrolyte fuel cell; and determining whether the open-circuit voltage is higher than a predetermined value.

Methods of the invention will be useful with a variety of fuel cell systems, including fuel cells employed with a motor vehicle.

Other aspects of the invention are discussed below.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

As discussed above, the invention provides methods for activation of a polymer electrolyte fuel cell. Preferred methods of the invention comprise an activating operation that may be repeated. Suitable activating operations may include obtaining from the fuel cell an output of a first predetermined voltage, controlling in a first operation the fuel cell stack in a no-load open-circuit voltage state, obtaining from the fuel cell an output of a second predetermined voltage, and controlling in a second operation the fuel cell stack in a no-load open-circuit voltage state. Prior to the activating operation, current (power) may be applied to a fuel cell system. Prior to such current application, the fuel cell suitably may be humidified.

Hereinafter, a preferred embodiment of the present invention will be described in detail with reference to the accompanying drawings.

Figure 1:
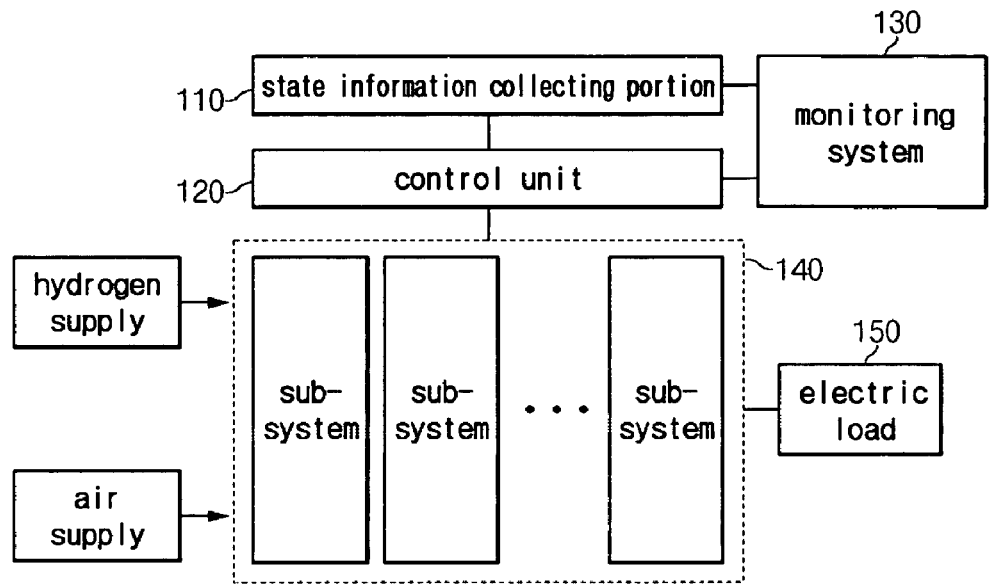
FIG. 1 is a block diagram of a system for performing an initial activation of a polymer electrolyte fuel cell (PEFC) according to an embodiment of the present invention.

FIG. 1 shows a system for performing a method for an initial activation of a polymer electrolyte fuel cell (PEFC) according to an embodiment of the present invention.

A state information collecting portion 110 is provided with a plurality of sensors and detecting members for monitoring various states of a fuel cell system, and outputs a plurality of signals indicative of information such as temperatures, pressures, and amounts of flow of air, hydrogen, and coolant, and other information such as humidity, and an output voltage of a fuel cell stack to a control unit 120. A monitoring system 130 monitors operations of the state information collection portion 110 and the control unit 120.

The control unit 120 controls a plurality of sub-systems 140 such as a fluid supplying sub-system, a humidifying sub-system, etc., and an electric load 150, on the basis of the information input from the state information collecting portion 110, and thereby an activation operation is performed through the control of the control unit 120.

Figure 2:
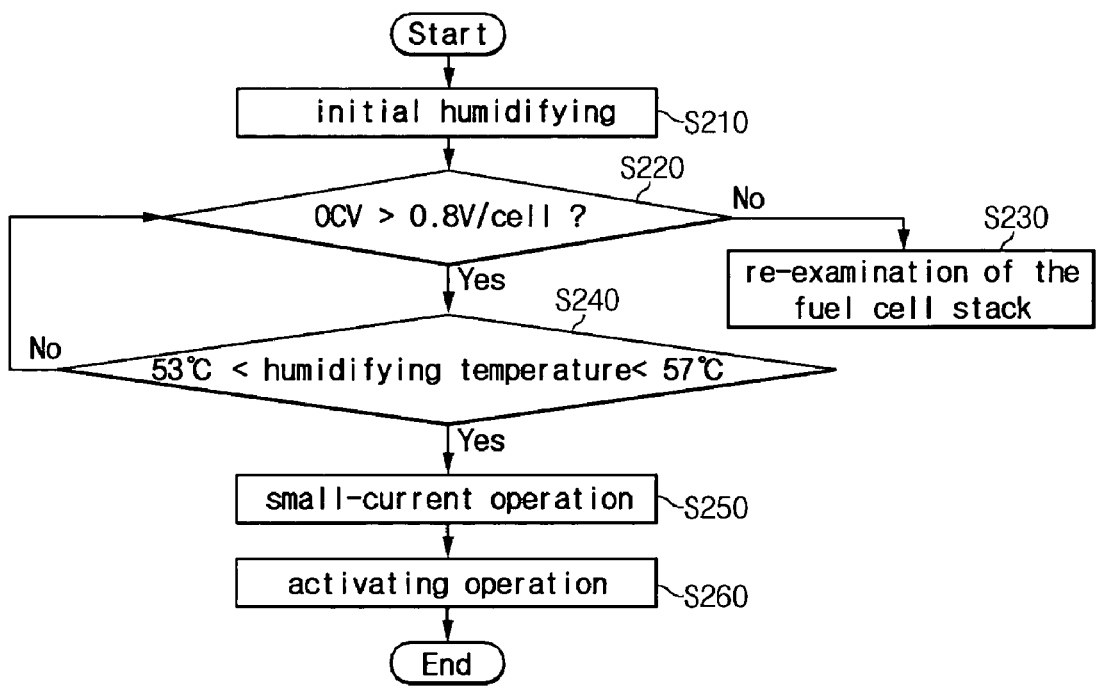
FIG. 2 is a flow chart showing a method for an initial activation according to an embodiment of the present invention.

A flow chart showing a method for initial activation of a fuel cell according to an embodiment of the present invention is shown in FIG. 2.

After installing a manufactured fuel cell to the system of FIG. 1, humidifying and cooling treatments are started, and an initial humidifying treatment is performed at step S210.

Preferably, an amount of hydrogen flow is 1.5 times of an amount of hydrogen flow that is theoretically required in a reaction under a current density of 0.1 A/cm², and an amount of air flow is 2.0 times of an amount of air flow that istheoretically required in a reaction under a current density of 0.1 A/cm².

Movements of ions, which determine an efficiency of the fuel cell, are basically dependent on the characteristics of a membrane electrode assembly ("MEA"). Because the MEA is manufactured through a high-temperature pressing process and a drying process, the moisture content of the MEA is typically very low. In addition, the MEA may contain one or more impurities (e.g., isobutylene alcohol) that can enter into the MEA during a process for forming a passage of ions and electrons. As a consequence, it can be difficult for sulfonic acid group (—SO3H) or other protonic groups to effectively transmit hydrogen ions as desired.

Therefore, reacting gases of sufficient amount that are supplied in a sufficiently humidified state by the humidifying treatment in step S210 eliminates ions, which may be associated with the MEA through a relatively small coupling force, such as Na+, during a fuel cell reaction by substituting those ions with hydrogen ions. At the same time, the supplied reacting gases can enlarge passages of ions from a hydrogen electrode to an air electrode. Consequently, the overall efficiency of movement of ions can be improved.

Then, in the depicted step S220, a mean output voltage of a unit cell of the fuel cell stack in a state of an open-circuit voltage (OCV) is detected, and then it is determined whether the mean output voltage of the unit cell exceeds a predetermined voltage, preferably, 0.8V/cell.

The predetermined voltage is a reference value for determining whether the fuel cell stack has been assembled properly. So, if it is determined that the mean output voltage of the unit cell does not exceed a predetermined voltage at step S220, the fuel cell stack can be recognized as deficient and the fuel cell stack reexamined at step S230.

If it is determined that the mean output voltage of the unit cell exceeds a predetermined voltage at step S220, it is then determined whether a humidifying temperature of the fuel cell stack is within a predetermined temperature range at step S240. For at least certain systems, preferably, the predetermined temperature range is a range of about 53° C. to 57° C. Again for at least certain systems, it can be preferred that the humidifying temperature of the fuel cell stack is about 55° C.

If the humidifying temperature is within the predetermined temperature range, a small-current operation is performed for a time sufficient such as about 0.5 to 3 minutes, more typically about 2 minutes, by supplying hydrogen and air in an open-circuit voltage state at step S250. For at least certain systems, during the small-current operation, an amount of supplied hydrogen flow is preferably at least about 1.5 times of an amount of hydrogen flow that is theoretically required in a reaction under a current density of 0.1 A/cm², and an amount of supplied air flow is preferably at least about 2.0 times of an amount of air flow that is theoretically required under a current density of 0.1 A/cm².

The load operation, for more than a specific time in the humidifying treatment of step S210, may utilize only a portion of passages for ion movement, and it may result in a detrimental effect on overall activation of the fuel cell. Therefore, the small-current operation in which the fuel cell is maintained in the open-circuit voltage state for about 2 minutes is performed whereby the MEA again is in an initial state.

The small-current operation step (S250) can be suitably performed on the basis of the conditions set forth in the following Table 1.

TABLE 1

| | Small-current operation |
|---|---|
| Operating temperature | Ambient temperature~55° C. |
| Humidifying temperature | 55° C. ± 2 |
| Driving pressure | Ambient pressure |
| Amount of hydrogen flow | Theoretical amount of 0.1 A/cm² of current density × 1.5 |
| Amount of air flow | Theoretical amount of 0.1 A/cm² of current density × 2 |
| Time | 2 minutes |
| Output voltage | OCV |

After the small-current operation, at step S260, an activating operation is performed by repeatedly performing an activation cycle a predetermined number of times. The activation cycle suitably includes: a first driving operation for driving the fuel cell stack to output a first predetermined voltage; a first pausing operation for controlling the fuel cell stack in a no-load open-circuit voltage state; a second driving operation for driving the fuel cell to output a second predetermined voltage; and a second pausing operation for controlling the fuel cell stack in the no-load open-circuit voltage state.

Because loads of the first and second driving operations are different from each other, passages for ion movement can be effectively formed during the first and second driving operations. In addition, by performing the pausing operation for initializing the fuel cell between the driving operations, new passages for ion movement can be effectively formed.

The activating operation can be suitably performed on the basis of the conditions set forth in the following Table 2.

under a current density of 2 A/cm$^2$, and an amount of supplied air flow is preferably 2.0 times of an amount of air flow that is theoretically required under a current density of 2 A/cm$^2$.

At step S345, an open-circuit voltage is again detected and stored, and then the load is turned on and a current is increased by a rate of 10 A/sec at step S350.

A second output voltage $V_{2\_mean}$, which is defined as a mean output voltage of a unit cell, is detected while the current is being increased, and it is determined whether the second output voltage is within a predetermined range, preferably within a range of 0.39~0.41V, at step S355.

If it is determined that the second output voltage is within a predetermined range, at step S360, the current operating state is suitably maintained for about 30 minutes.

Then, at step S365, a second output (e.g., voltage, current, and/or power) of the fuel cell is detected and stored. Then, at

TABLE 2

|  | First driving operation | First pausing operation | Second driving operation | Second pausing operation |
|---|---|---|---|---|
| Operating temperature | 55~65° C. | 55~65° C. | 55~65° C. | 55~65° C. |
| Humidifying temperature | 55° C. ± 2 | 55° C. ± 2 | 55° C. ± 2 | 55° C. ± 2 |
| Driving pressure | Ambient pressure | Ambient pressure | Ambient pressure | Ambient pressure |
| Amount of hydrogen flow | Theoretical amount of 1.0 A/cm$^2$ of current density × 1.5 | Theoretical amount of 1.0 A/cm$^2$ of current density × 1.5 | Theoretical amount of 2.0 A/cm$^2$ of current density × 1.5 | Theoretical amount of 2.0 A/cm$^2$ of current density × 1.5 |
| Amount of air flow | Theoretical amount of 1.0 A/cm$^2$ of current density × 2 | Theoretical amount of 1.0 A/cm$^2$ of current density × 2 | Theoretical amount of 2.0 A/cm$^2$ of current density × 2 | Theoretical amount of 2.0 A/cm$^2$ of current density × 2 |
| Time | 30 minutes | 2 minutes | 30 minutes | 2 minutes |
| Output voltage | 0.60 ± 0.01 V/cell | OCV | 0.40 ± 0.01 V/cell | OCV |

Figure 3:
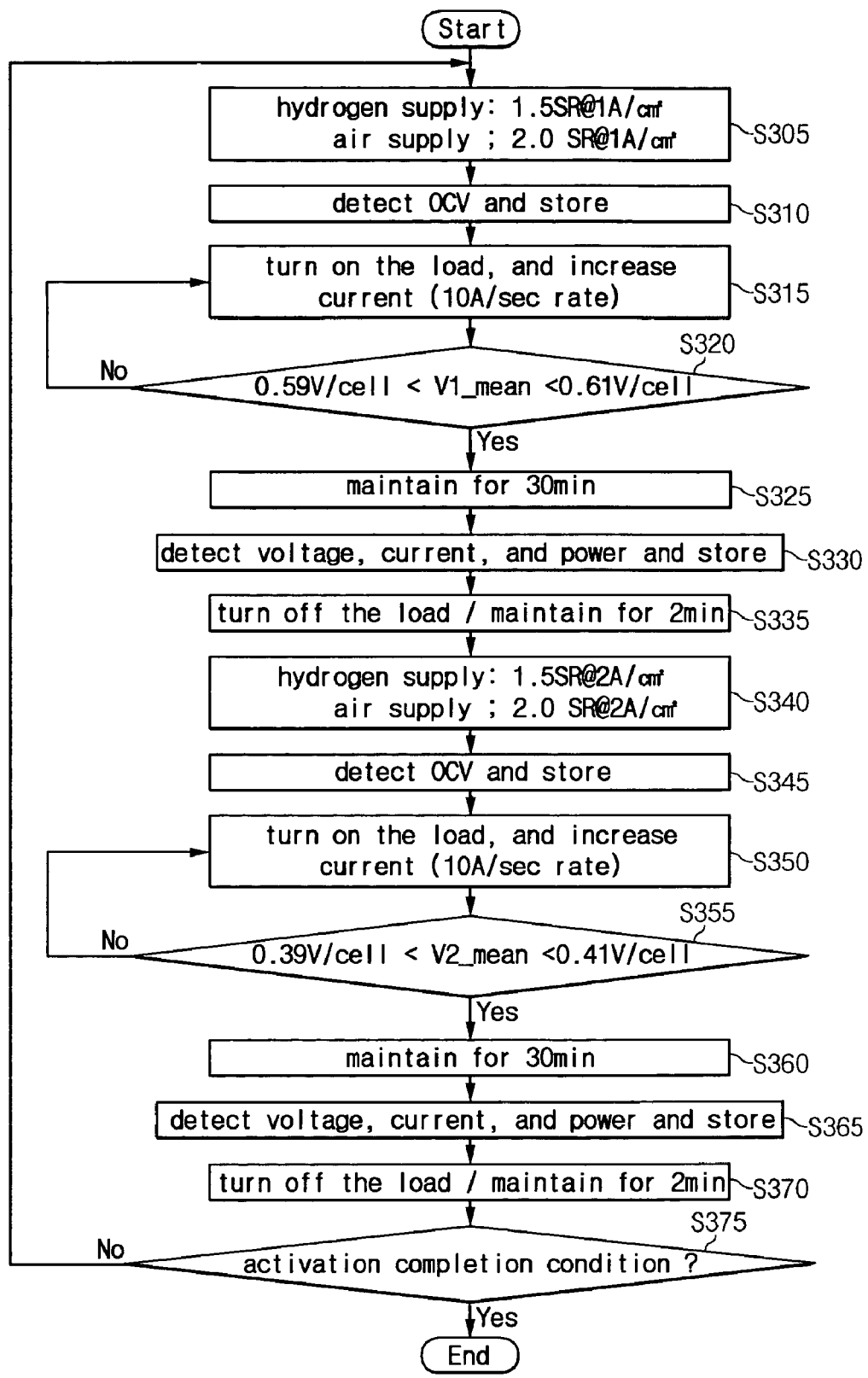
FIG. 3 is a flow chart showing an activating operation in FIG. 2.

FIG. 3 is a flow chart showing detailed steps of the activating operation (S260).

As shown in FIG. 3, at step S305, hydrogen and air are supplied in an open-circuit voltage state. At the step S305, an amount of supplied hydrogen flow is preferably 1.5 times of an amount of hydrogen flow that is theoretically required in a reaction under a current density of 1 A/cm$^2$, and an amount of supplied air flow is preferably 2.0 times of an amount of air flow that is theoretically required under a current density of 1 A/cm$^2$.

At step S310, an open-circuit voltage is detected and stored, and then the load is turned on and a current is increased by a rate of 10 A/sec at step S315.

A first output voltage $V_{1\_mean}$, which is defined as a mean output voltage of a unit cell, is detected while the current is being increased, and it is determined whether the first output voltage is within a predetermined range, preferably within a range of 0.59~0.61V, at step S320.

If it is determined that the first output voltage is within a predetermined range, at step S325, the current operating state is suitably maintained for about 30 minutes.

Then, at step S330, a first output (e.g., voltage, current, and/or power) of the fuel cell is detected and stored. Then, at step S335, the load is turned off and an operation of the fuel cell is stopped in an open-circuit voltage state for about 2 minutes.

Then, at step S340, hydrogen and air are again supplied in an open-circuit voltage state. At the step S340, an amount of supplied hydrogen flow is preferably 1.5 times of an amount of hydrogen flow that is theoretically required in a reaction step S370, the load is turned off and an operation of the fuel cell is stopped in an open-circuit voltage state suitably for about 2 minutes.

The steps S305 to S370 are repeatedly performed as one cycle. When each cycle has been terminated, at step S375, it is determined whether the first and second outputs of a previous cycle are greater than 95% of an output of the fuel cell stack at an end of a current activating operation, and if so, it is determined that activation has been completed.

Figure 4:
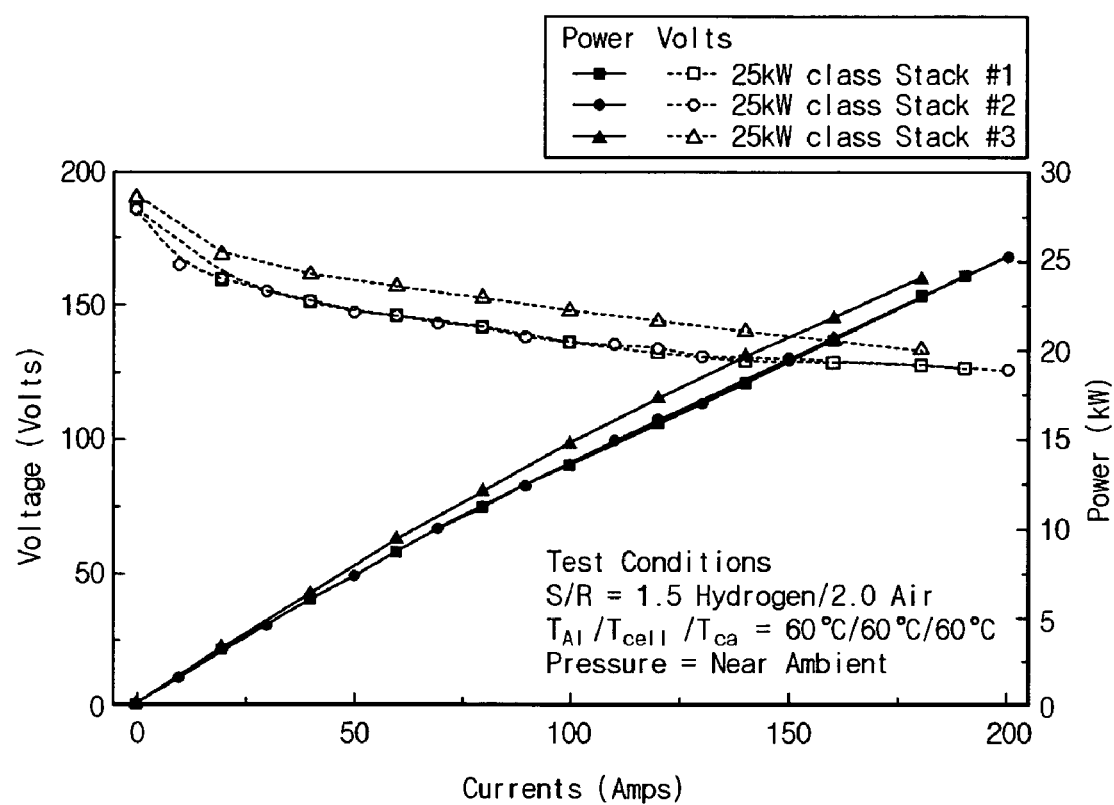
FIG. 4 illustrates graphs comparing efficiency curves according to a method for an initial activation according to an embodiment of the present invention and a conventional initial activation method.

FIG. 4 illustrates graphs comparing efficiency curves according to a method for initial activation for a 25 kW class fuel cell stack according to an embodiment of the present invention and a conventional initial activation method. Efficiency curve #3 having triangular indications is for the method according to the embodiment of the present invention, and efficiency curves #1 and #2 respectively having rectangular indications and circular indications are for the conventional methods.

As shown in the drawing, under the same operating conditions, the method for the initial activation according to an embodiment of the present invention has a superior efficiency than the conventional method.

According to a method for initial activation of a fuel cell, a time for activation can be reduced, and long continuous operation is not needed. In addition, an overall efficiency of the fuel cell that is activated by the method for initial activation according to an embodiment of the present invention is substantially improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for initial activation of a polymer electrolyte fuel cell, comprising:
    applying current to the fuel cell; and
    performing an activating operation that comprises: a first driving operation for driving the fuel cell to output a first predetermined voltage, a first pausing operation for controlling the fuel cell in a no-load open-circuit voltage slate, a second driving operation for driving the fuel cell to output a second predetermined voltage, and a second pausing operation for controlling the fuel cell in the no-load open-circuit voltage state,
    wherein applying the current to the fuel cell is conducted under conditions that comprise an operating temperature between an ambient temperature and 55° C., a humidifying temperature of 55° C.±2, driving pressure is an ambient pressure, an amount of hydrogen flow is a theoretical amount of 0.1 A/cm$^2$ of current density×1.5, an amount of air flow is of 0.1 A/cm$^2$ of current density×2, a time is 2 minutes, and an Output voltage is OCV,
    the first driving operation is conducted under conditions that comprise an operating temperature between 55° C. and 65° C., a humidifying temperature of 55° C.±2, driving pressure is an ambient pressure, an amount of hydrogen flow is 1.0 A/cm$^2$ of current density×1.5, an amount of air flow is 1.0 A/cm$^2$ of current density×2, a time is 30 minutes, and an output voltage is 0.60±0.01 V/cell;
    the first pausing operation is conducted under conditions that comprise an operating temperature between 55° C. and 65° C., a humidifying temperature of 55 C±2, driving pressure is an ambient pressure, an amount of hydrogen flow is 1.0 A/cm$^2$ of current density×1.5, an amount of air flow is 1.0 A/cm$^2$ of current density×2, a time is 2 minutes, and an output voltage is OCV,
    the second driving operation is conducted under conditions that comprise an operating temperature between 55° C. and 65° C., a humidifying temperature of 55 C±2, driving pressure is an ambient pressure, an amount of hydrogen flow is 2.0 A/cm$^2$ of current density×1.5, an amount of air flow is 2.0 A/cm$^2$ of current density×2, a time is 30 minutes, and an output voltage is 0.40±0.01 V/cell, and
    the second pausing operation is conducted under conditions that comprise an operating temperature between 55° C. and 65° C., a humidifying temperature of 55 C±2, driving pressure is an ambient pressure, an amount of hydrogen flow is 2.0 A/cm$^2$ of current density×1.5, an amount of air flow is 2.0 A/cm$^2$ of current density×2, a time is 2 minutes, and an output voltage is OCV.

2. The method of claim 1, wherein the fuel cell is humidified and then power is applied to the humidified fuel cell.

3. The method of claim 2, wherein the fuel cell is humidified until a temperature of the fuel cell reaches a predetermined humidifying temperature.

4. The method of claim 3, wherein the predetermined humidifying temperature is determined as a temperature within a range of 53 to 57° C.

5. The method of claim 1, wherein performing the activating operation is finished if an output of the fuel cell stack at an end of a previous activating operation becomes greater than 95% of an output of the fuel cell stack at an end of a current activating operation.

6. The method of claim 1, further comprising performing a fuel cell test operation that comprises measuring an open-circuit voltage of the polymer electrolyte fuel cell; and determining whether the open-circuit voltage is higher than a predetermined value.

* * * * *